(12) United States Patent
Fei et al.

(10) Patent No.: US 12,384,931 B1
(45) Date of Patent: Aug. 12, 2025

(54) RFID COMPOSITE CONDUCTIVE PASTE, METHOD FOR PREPARING THE SAME, AND RFID ELECTRONIC TAG

(71) Applicant: YUNSHI TECHNOLOGY CO. LTD, Shandong (CN)

(72) Inventors: Jiabo Fei, Shandong (CN); Sheng Jiang, Shandong (CN)

(73) Assignee: YUNSHI TECHNOLOGY CO. LTD, Shandong (CN)

( * ) Notice: Subject to any disclaimer, the term of this patent is extended or adjusted under 35 U.S.C. 154(b) by 0 days.

(21) Appl. No.: 18/866,053

(22) PCT Filed: Jul. 24, 2023

(86) PCT No.: PCT/CN2023/108897
§ 371 (c)(1),
(2) Date: Nov. 14, 2024

(87) PCT Pub. No.: WO2023/241731
PCT Pub. Date: Dec. 21, 2023

(30) Foreign Application Priority Data

Jun. 17, 2022 (CN) .......................... 202210682924.9

(51) Int. Cl.
| C09D 11/52 | (2014.01) |
| C09D 11/037 | (2014.01) |
| C09D 11/102 | (2014.01) |
| G06K 19/077 | (2006.01) |
| H01B 1/22 | (2006.01) |
| H01B 1/24 | (2006.01) |

(52) U.S. Cl.
CPC ............ *C09D 11/52* (2013.01); *C09D 11/037* (2013.01); *C09D 11/102* (2013.01); *G06K 19/0772* (2013.01); *H01B 1/22* (2013.01); *H01B 1/24* (2013.01)

(58) Field of Classification Search
CPC .... G09D 11/52; G09D 11/037; G09D 11/102; G06K 19/0772; G06K 19/06046; H01B 1/22; H01B 1/24
USPC .......................................... 235/492, 487, 375
See application file for complete search history.

(56) References Cited

U.S. PATENT DOCUMENTS

| 2011/0025580 A1* | 2/2011 | Gray ...................... H01Q 1/242 |
| | | 343/892 |
| 2020/0123379 A1* | 4/2020 | Waicukauski .......... C08L 75/06 |

FOREIGN PATENT DOCUMENTS

| CN | 105551698 A | 5/2016 | |
| CN | 113122072 A | 7/2021 | |
| WO | WO-2012042348 A2 * | 4/2012 | ............. H01Q 5/357 |

OTHER PUBLICATIONS

Notification of Allowance dated Aug. 10, 2022 received in Chinese Patent Application No. 202210682924.9.

(Continued)

*Primary Examiner* — Edwyn Labaze
(74) *Attorney, Agent, or Firm* — Scully, Scott, Murphy & Presser, P.C.

(57) ABSTRACT

An RFID composite conductive paste, a preparation method, and RFID electronic tags are provided. The RFID composite conductive paste includes the following components in parts by weight: 10-25 parts of oil-soluble special cross-linked resin, 30-50 parts of metal conductive agent, 5-10 parts of two-dimensional carbon-based material, 20-50 parts of organic solvent, 10-20 parts of quick-drying agent, and 2-5 parts of leveling agent.

6 Claims, 5 Drawing Sheets

(56) References Cited

OTHER PUBLICATIONS

First Office Action dated Jul. 29, 2022 received in Chinese Patent Application No. CN 202210682924.9.

\* cited by examiner

Placing oil-soluble special cross-linked resin and organic solvent in container, heat oil-soluble special cross-linked resin and organic solvent to 50° C, and dispersing oil-soluble special cross-linked resin and organic solvent at dispersion frequency of 1800-2200 rpm for a dispersion time of 50-70 minutes to obtain conductive paste carrier Adding two-dimensional carbon-based material and metal conductive agent to conductive paste carrier and stirring conductive paste carrier for 25-35 minutes to obtain carbon-based composite conductive paste Adding quick-drying agent and leveling agent to carbon-based composite conductive paste and disperse carbon-based composite conductive paste at dispersion frequency of 800-1200 rpm for dispersion time of 25-35 minutes to obtain RFID composite conductive paste Using grinder to grind RFID composite conductive paste

FIG. 7

RFID COMPOSITE CONDUCTIVE PASTE, METHOD FOR PREPARING THE SAME, AND RFID ELECTRONIC TAG

CROSS REFERENCE TO RELATED APPLICATIONS

The present disclosure is a continuation application of PCT Application Serial No. PCT/CN2023/108897, filed on Jul. 24, 2023, which claims the priority to Chinese Patent Application No. 202210682924.9 filed Jun. 17, 2022, the entire disclosures of all of which are incorporated herein by reference.

TECHNICAL FIELD

The present application belongs to the technical field of electronic materials and electronic equipment, and particularly relates to new materials and new processes for preparing electronic components and manufactured electronic components. Specifically, the present application provides an RFID composite conductive paste, a method for preparing the same, and an RFID electronic tag.

BACKGROUND

RFID technology, also known as radio frequency identification technology, was originally derived from radar technology and is a type of automatic identification technology. The working principle of the RFID technology is to use wireless radio frequency for non-contact two-way communication and use electronic tags or radio frequency cards for reading and writing. The advantage of RFID technology is the contactless, high-speed, and accurate identification. As the technical foundation of the Internet of Things, related industries and technologies are developing rapidly.

The preparation material of traditional RFID electronic tags is metal film (such as aluminum foil or copper foil), which is prepared through a metal etching process. The production process includes preparation of the substrate, coating of photosensitive material, continuous exposure, development, etching, film removal, washing, and drying.

In recent years, with the continuous advancement of RFID component manufacturing technology, a method for manufacturing an RFID electronic tag based on a printing process has appeared on the market. This method uses gravure printing and other processes to print liquid conductive paste on the substrate according to a preset pattern, dry and solidify it through heating, light curing, etc., to obtain a conductive RFID electronic tag. For example, the patent application No. 201810111964.1 discloses a preparation method of graphene conductive ink that can be used for RFID electronic tags, and the patent application 201910216604.2 discloses a graphene-based RFID antenna and its printing method.

SUMMARY

A first aspect of the present application provides an RFID composite conductive paste, which includes the following components: 10-25 parts by weight of oil-soluble special cross-linked resin, 30-50 parts by weight of metal conductive agent, 5-10 parts by weight of two-dimensional carbon-based material, 20-50 parts by weight of organic solvent, 10-20 parts by weight of quick-drying agent, and 10-20 parts by weight of leveling agent.

In some embodiments, the oil-soluble special cross-linked resin is a polyurethane-modified epoxy resin, and a carrier saturated solid content of the polyurethane-modified epoxy resin in an oil-soluble system is less than or equal to 55%.

In some embodiments, a high-cohesion chlorine-acetic resin is also added to the oil-soluble special cross-linked resin, and a dry-film density of the high-cohesion chlorine-acetic resin is more than or equal to 1.4 $g/m^3$.

In some embodiments, the two-dimensional carbon-based material is a physically prepared oil-soluble graphene paste that includes 9 to 11 graphene layers.

In some embodiments, the physically prepared oil-soluble graphene paste is prepared through the following steps: step 1: mixing a high-order intercalated graphite with a dibasic ester and an oil-soluble special cross-linked resin to obtain an initial graphene paste, wherein the high-order intercalated graphite has a magnification ratio of 150-350 times and a purity of more than or equal to 99%; and step 2: performing liquid-phase delamination on the initial graphene paste under a high pressure to obtain the physically prepared oil-based graphene paste that includes 9 to 11 graphene layers.

In some embodiments, the metal conductive agent is one of or a mixture of any two or more of silver-coated copper powder, silver-coated nickel powder, nickel-coated copper powder, and modified conductive copper powder.

In some embodiments, the quick-drying agent is one of or a mixture of any two or more of ethyl acetate, butyl acetate, acetone, and cyclohexanone.

A second aspect of the present application provides a method for preparing an RFID composite conductive paste, which is used to prepare the above-mentioned RFID composite conductive paste and includes the following steps: S1: placing an oil-soluble special cross-linked resin and an organic solvent in a container, heat the oil-soluble special cross-linked resin and the organic solvent to 50° C. and dispersing the oil-soluble special cross-linked resin and the organic solvent at a dispersion frequency of 1800-2200 revolutions per minute for a dispersion time of 50-70 minutes to obtain a conductive paste carrier; S2: adding a two-dimensional carbon-based material and a metal conductive agent to the conductive paste carrier and stirring the conductive paste carrier for 25-35 minutes to obtain a carbon-based composite conductive paste; S3: adding a quick-drying agent and a leveling agent to the carbon-based composite conductive paste and disperse the carbon-based composite conductive paste at a dispersion frequency of 800-1200 revolutions per minute for a dispersion time of 25-35 minutes to obtain an RFID composite conductive paste; and S4: using a grinder to grind the RFID composite conductive paste.

In some embodiments, the grinder is a three-roller grinder, a distance between opposite rollers is 0.4-0.6 mm, and the number of times of grinding is 1.

A third aspect of the present application provides an RFID electronic tag, which includes an insulating substrate, an RFID radio frequency circuit fixed on a surface of the insulating substrate, and a control chip electrically connected to the RFID radio frequency circuit. The RFID radio frequency circuit is made by gravure printing using the above-mentioned RFID composite conductive paste.

BRIEF DESCRIPTION OF DRAWINGS

FIG. 7 is a flowchart of a method for preparing an RFID composite conductive paste.

DESCRIPTION OF EMBODIMENTS

Figure 1:
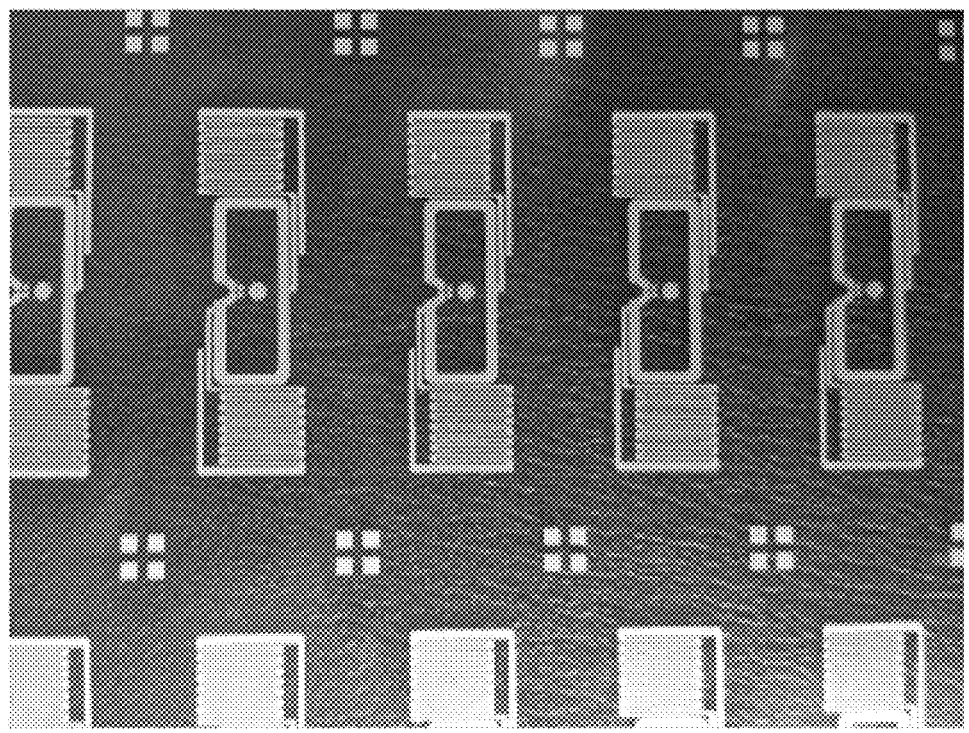
FIG. 1 is a schematic diagram of an RFID electronic tag sample.

Hereinafter, the present application will be further described based on preferred embodiments and with reference to the drawings.

In addition, various components in the drawings are enlarged or shrunk to facilitate understanding, but this is not intended to limit the scope of the present application.

Words in the singular form also include the plural form and vice versa.

In the description of the embodiments of the present application, it should be noted that the terms "upper", "lower", "inner", "outer", etc. are used to indicate the orientational or positional relationship indicated based on the orientation or position shown in the drawings or the orientational or positional relationship in which the products of the embodiments of the present application are commonly placed when used. They are only used for the convenience of describing the present application and simplifying the description, but not intended to indicate or imply that the apparatus or power device referred to must have a specific orientation, be constructed and operated in a specific orientation, and therefore should not be construed as limiting this application. In addition, in the description of this application, in order to distinguish different units, terms such as first and second are used in this specification, but these will not be limited by the order of manufacture, nor can they be understood to indicate or imply relative importance. These terms may be different in the detailed description and claims of this application.

The vocabulary in this specification is used to describe the embodiments of the present application, but is not intended to limit the present application. It should also be noted that unless otherwise clearly stated and limited, the terms "set", "connected" and "connection" should be understood in a broad sense. For example, it can be a fixed connection, a detachable connection, or an integrated connection; a mechanical connection, a direct connection, an indirect connection through an intermediate medium; or an internal connection between two power devices. Those skilled in the art can specifically understand the specific meanings of the above terms in the present application.

In order to better explain the technical solutions of the present application, a process flow of manufacturing an RFID electronic tag using printing means is first introduced, and the problems and causes of the existing conductive ink in the conventional technique are analyzed.

FIG. 1 is a schematic diagram of an RFID electronic tag sample. As shown in FIG. 1, an RFID radio frequency circuit with a specific pattern is attached to an insulating substrate. The process flow of manufacturing the above-mentioned RFID electronic tag using printing means generally includes the following steps: pouring or applying liquid conductive ink into a groove having a corresponding mirror pattern of a radio frequency circuit; using a scraper to level the conductive ink in the groove and remove the conductive ink outside the groove; transferring the conductive ink to the insulating substrate by roller pressing or other methods to form a positive circuit pattern; and performing operations of drying, curing, etc., on the conductive ink to finally obtain an RFID electronic tag.

In order to obtain an RFID electronic tag with excellent conductivity and high consistency of product parameters, the printing and manufacturing process of the above-mentioned RFID electronic tag has strict performance requirements for the conductive paste used. An ideal conductive paste may have the following characteristics.

(1) High Solid Content of Conductive Components

Since RFID radio frequency circuits printed with conductive paste need to have good conductivity and reflection characteristics of ultra-high frequency radio waves, the paste should have the ideal ability to accommodate solid conductive components to ensure that the circuit pattern formed after drying and curing contains sufficient conductive components.

(2) Conductive Component Having Ideal Dispersion and Uniformity

When the paste can fully accommodate the conductive components, the distribution situation of the above-mentioned conductive components in the paste will affect the conductive performance of the final manufactured RFID circuit and the consistency of product performance parameters. In particular, the conductive components need to fully disperse in the paste to ensure that all parts have conductive components, and it also needs to have good uniformity to avoid the problems of unstable conductivity and signal reflection performance at different locations and a decrease in yield due to uneven distribution and agglomeration of conductive components.

(3) Relationship Between Fluidity and Adhesion and Between Quick-Drying and Bonding being Relatively Balanced When poured into the printing gravure plate, the above-mentioned conductive paste must have good fluidity to ensure the integrity of the circuit pattern, must have good adhesion so that the circuit can be firmly attached to the insulating substrate, must have quick-drying property to meet the needs of large-scale batch production, and must ensure that the conductive components in the paste are closely combined to prevent problems such as pattern breakage during rapid drying. Therefore, it is necessary to modify and optimize each component and to adjust the ratio and preparation process to achieve an overall optimal effect.

(4) Conductive Paste Material Having Stable Properties

Since there are various solid and liquid components with different properties in the conductive paste, each component also needs to be modified and optimized to improve the affinity between the components, so as to avoid delamination, precipitation, and other phenomena in the paste, which will affect the product stability of the conductive paste.

However, various conductive inks and pastes that have been disclosed in the conventional technique have various defects to varying degrees. These defects mainly include the following aspects.

(1) Most of the conductive pastes used in the existing technology are prepared by simple physical mixing of water-based resin, ordinary graphene materials, and metal conductive agents (metal powder), and their conductive properties are slightly poor.

(2) Due to the characteristics of metal conductive powder and graphene themselves, their large specific surface area and large surface tension of the water-based system make it difficult for the water-based resin to fully wet the surface, such that the entire paste system is hard to disperse evenly and prone to agglomeration, thereby affecting the conductivity and parameter consistency of the printed RFID circuit. In addition, the paste system is prone to delamination and precipitation when left for a long time, resulting in a decrease in the stability of the paste.

(3) The water-based conductive paste does not match the gravure printing process due to its slow drying speed, resulting in slow product production and difficulty in achieving large-scale mass production.

In order to solve the various defects of the above-mentioned existing conductive paste, one aspect of the embodiments of the present application provides an RFID composite conductive paste, which includes the following components: 10-25 parts by weight of oil-soluble special cross-linked resin, 30-50 parts by weight of metal conductive agent, 5-10 parts by weight of two-dimensional carbon-based material, 20-50 parts by weight of organic solvent, 10-20 parts by weight of quick-drying agent, and 2-5 parts by weight of leveling agent.

In some embodiments, the above-mentioned oil-soluble special cross-linked resin is used as a matrix to carry a conductive component including the metal conductive agent and the two-dimensional carbon-based material to form an oil-soluble conductive paste system, the two-dimensional carbon-based material is used to serve as a gap-filling agent for the metal conductive agent to form a composite conductive structure, the organic solvent is used to dilute and adjust the concentration and viscosity of the conductive paste, the leveling agent is used to increase the fluidity of the conductive paste, and the quick-drying agent is used to speed up the drying speed of the conductive paste.

In some embodiments of the present application, the oil-soluble special cross-linked resin is an epoxy resin that has been modified by polyurethane. In some embodiments, the above-mentioned epoxy resin that has been modified by polyurethane has a higher carrier saturated solid content and a higher dry-film density than conventional epoxy resin, and its carrier saturated solid content in oil-soluble systems is more than or equal to 55%, and its dry-film density is more than or equal to 1.2 g/m$^3$.

Table 1 below lists the performance comparison between polyurethane-modified epoxy resin and conventional epoxy resin in terms of carrier saturated solid content.

TABLE 1

Comparison of Carrier Saturated Solid Content of Polyurethane-Modified Epoxy Resin and Conventional Epoxy Resin

| Comparison Items | Carrier Saturated Solid Content |
|---|---|
| Conventional Epoxy Resin | =40% |
| Polyurethane-Modified Epoxy Resin | ≥55% |

In some embodiments of the present application, the oil-soluble special cross-linked resin can be obtained by performing polyurethane modification on epoxy resin. The modification of epoxy resin is a technology known to those skilled in the art. The operations in the implementation process, reactant ratio, reaction conditions, and so on can all be set according to the performance to be achieved.

In some embodiments of the present application, the oil-soluble special cross-linked resin can also be obtained directly by purchasing finished products. For example, modified epoxy resin and/or modified polyurethane resin produced by Huntsman Corporation of the United States can be used as the oil-soluble special cross-linked resin. In some embodiments, the above-mentioned thermoplastic resin produced by this company has excellent dispersion, which can greatly reduce the amount of used resin without affecting the dispersion of conductive paste, thereby significantly increasing the ratio of conductive agent in the overall formulation, thus improving the conductivity of the overall paste and greatly improving the performance of the printed electronic tags.

In some embodiments of the present application, a high-cohesion chlorine-acetate resin is also added to the oil-soluble special cross-linked resin, where the dry-film density of the high-cohesion chlorine-acetate resin (e.g., vinyl chloride vinyl acetate copolymer resin) is more than or equal to 1.4 g/m$^3$.

Table 2 below lists the comparison of the polyurethane-modified epoxy resin, the high-cohesion chlorine-acetate resin, and the conventional epoxy resin in terms of the performance of the dry-film density.

TABLE 2

Comparison of Dry Film Densities of Polyurethane-Modified Epoxy Resin, High-cohesion Chlorine-Acetate Resin, and Conventional Epoxy Resin

| Comparison Items | Dry-film density |
|---|---|
| Conventional Epoxy Resin | 0.8 g/cm$^3$ |
| Polyurethane-Modified Epoxy Resin | 1.2 g/cm$^3$ |
| High-cohesion Chlorine-Acetate Resin | 1.4 g/cm$^3$ |

The conventional epoxy resin has high viscosity and is difficult to prepare into a conductive paste carrier with high solid content. It also has problems such as poor fluidity, thick film layer after curing, low density, and high brittleness. Since the groove depth used in gravure printing is shallow (micron level) and the pattern width is on the millimeter scale, conductive paste prepared based on conventional epoxy resin is prone to encounter problems such as poor circuit conductivity, poor ultra-high frequency radio wave reflection characteristic, incomplete circuit patterns, and easy breakage when used in gravure printing RFID circuits.

In some embodiments of the present application, the polyurethane-modified epoxy resin is used as the oil-soluble special cross-linked resin. In some embodiments, high-cohesion chlorine-acetate resin is added to the oil-soluble special cross-linked resin. The above-mentioned oil-soluble special cross-linked resin is used as a conductive paste carrier. Compared with the conventional epoxy resin, this oil-soluble special cross-linked resin contains polyurethane-modified epoxy resin, has a higher saturated solid content, and may carry more conductive components per unit volume, thus effectively improving the conductive performance and reflective properties of printed circuits. In some embodiments, the addition of high-cohesion chlorine-acetate resin may not only reduce the viscosity of the paste, but also achieve good dispersion of the powdery conductive components by improving the cohesion of the paste, thereby effectively increasing the density after film formation, reducing the dry film layer thickness, and enhancing the flexibility of the dry film and its adhesion to the substrate.

In some embodiments of the present application, phenoxy resin and/or polyester resin are also added to the oil-soluble special cross-linked resin. In some embodiments, the advantage of the phenoxy resin and the polyester resin is that they help to disperse the conductive paste, making the appearance of the conductive paste more delicate, which improves the printing performance of the conductive paste itself such that the surface of the electronic tag printed through gravure printing is smooth and flat, and the performance consistency is greatly improved.

In some embodiments of the present application, the metal conductive agent is one of or a mixture of any two or more of silver-coated copper powder, silver-coated nickel powder, nickel-coated copper powder, and modified conductive copper powder.

In some embodiments of the present application, the two-dimensional carbon-based material is a physically prepared oil-soluble graphene paste in which the number of graphene layers is 9 to 11. The above physically prepared oil-soluble graphene paste is prepared through the following steps.

The first step: mixing high-order intercalated graphite, dibasic ester (DBE solvent), and oil-soluble special cross-linked resin to obtain an initial graphene paste, where the magnification factor of the high-order intercalated graphite is 150-350 times and the purity is more than or equal to 99%.

The second step: performing liquid-phase delamination on the above-mentioned initial graphene paste under high pressure to obtain a physically prepared oil-soluble graphene paste with the number of graphene layers more than or equal to 9 and less than or equal to 11.

In some embodiments, the graphene material mixed into the conductive paste used for printing RFID electronic tags is used as a filling agent for the metal powder of the metal conductive agent, so that the metal powder dispersed in the resin carrier may be effectively connected, further enhancing the conductive and reflective properties of the printed circuit through a synergistic effect.

Figure 2:
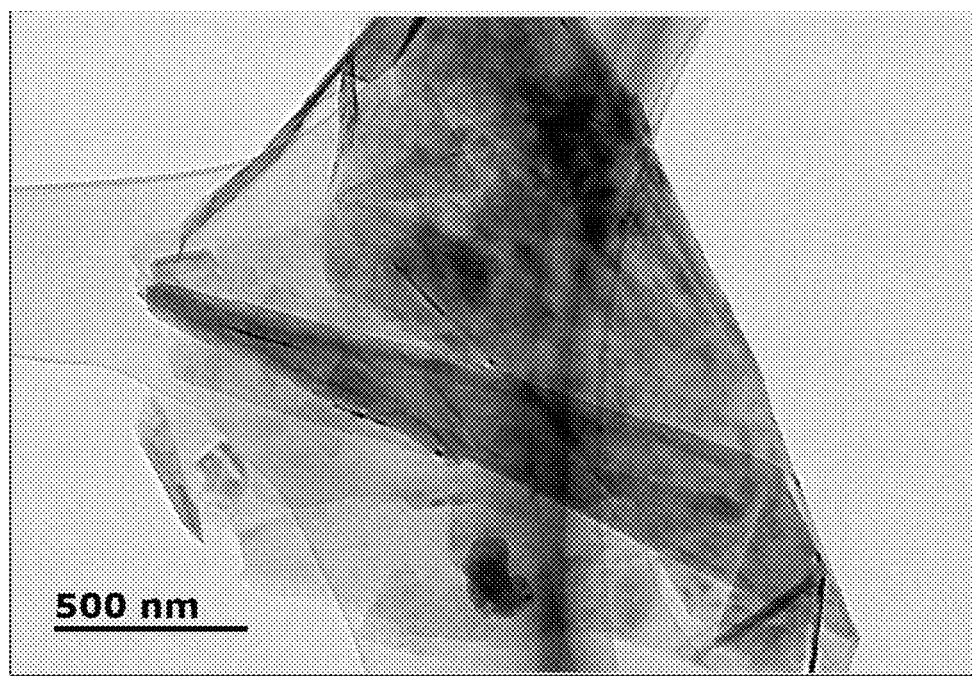
FIG. 2 shows a microstructure of a conventional graphene material.

However, the graphene used in the conventional technique is a conventional graphene material. FIG. 2 shows the microstructure of conventional graphene material. As can be seen from this figure, the thickness is obviously uneven and there is an agglomeration phenomenon. In addition, the range of the layers of the conventional graphene material is large and irregular. Although the part with fewer layers has improved conductivity, its particle size is small, making it difficult to serve as a filler. The conductivity of the part with more layers shows a significant decrease. When the above-mentioned conventional graphene material that has not been optimized is added to the conductive paste, due to its chaotic microstructure, it cannot produce a good synergistic effect with the conductive metal powder, and may even have adverse effects.

In some embodiments of the present application, the graphene material added to the conductive paste is an optimized physically prepared oil-soluble graphene paste, in which the initial graphene paste is obtained by mixing low-magnification high-purity high-order intercalated graphite raw materials with dibasic esters. In some embodiments, this initial graphene paste has a low magnification rate and high purity, can easily disperse, and has a good intercalation effect. By performing liquid-phase delamination on the above-mentioned initial graphene paste under high pressure, a physical oil-soluble graphene paste with about 10 graphene layers can be obtained.

Figure 3:
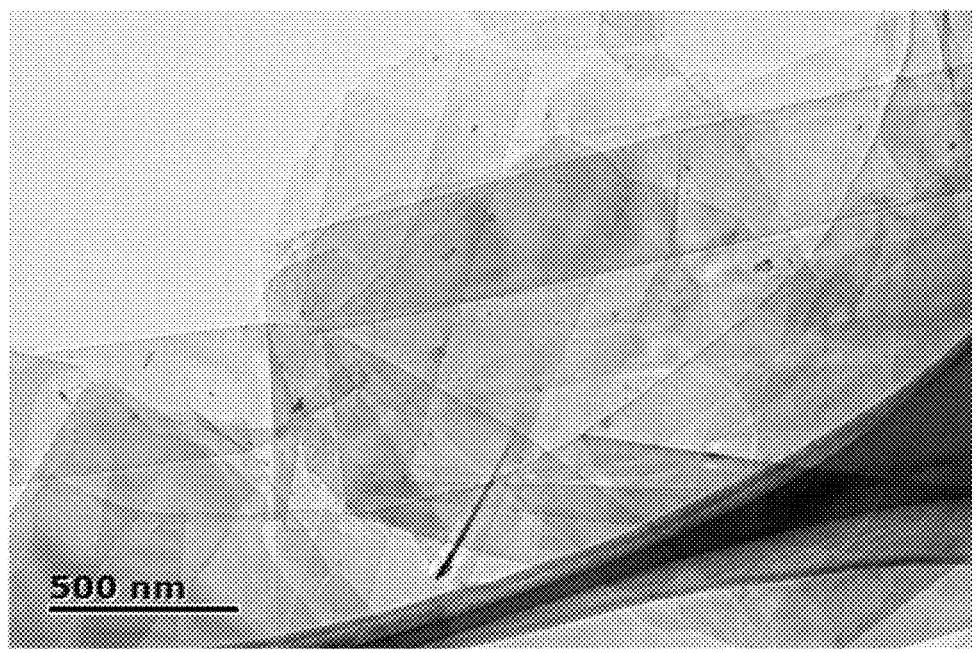
FIG. 3 shows a microstructure of a physically prepared oil-soluble graphene paste provided according to exemplary embodiments of the present application.
Figure 4:
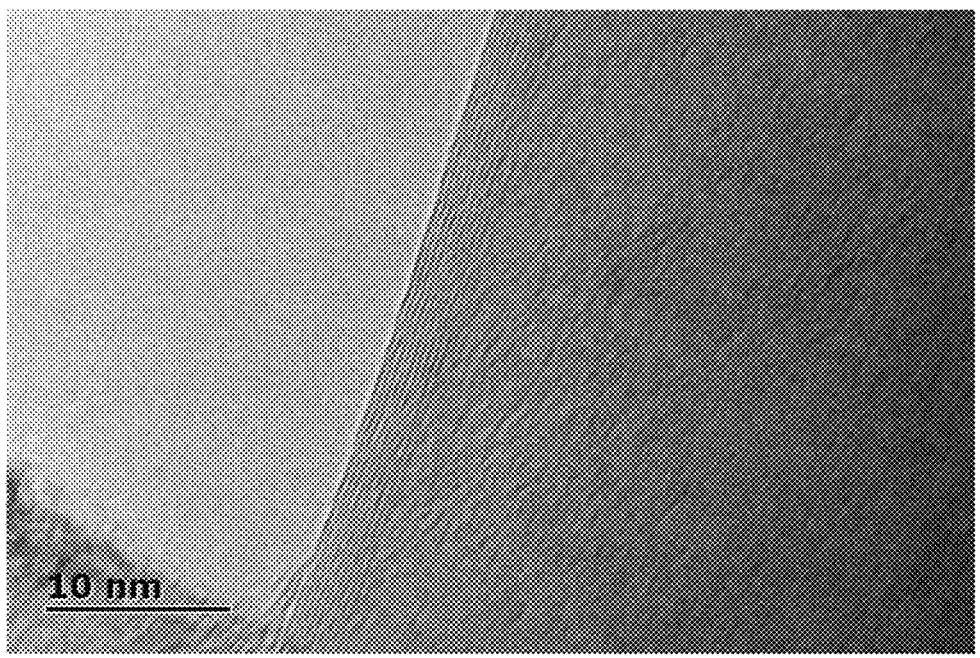
FIG. 4 is a partially enlarged view of FIG. 3.

FIG. 3 shows the microstructure of the physically prepared oil-soluble graphene paste provided according to embodiments of the present application, and FIG. 4 is the partially enlarged structure of FIG. 3. It can be seen from FIG. 3 and FIG. 4 that the physically prepared oil-soluble graphene paste used in some embodiments of the present application has a more uniform thickness compared to conventional graphene materials. In addition, its microstructure has been optimized, and the number of layers is relatively consistent such that it may have excellent conductivity and filling effect at the same time, thereby forming a good synergistic effect with the metal conductive agent and further improving the performance indicators of the RFID circuit.

Table 3 below lists the comparison of performance parameters of the physically prepared oil-soluble graphene paste provided by some embodiments of the present application and the conventional graphene material (where the ratio of the graphene component, the types and ratio of other components, and the preparation process are the same). FIG. 2, FIG. 3, and Table 3 show that the oil-soluble graphene paste provided by some embodiments of the present application is improved in terms of microstructure, filling performance, and conductive performance compared with the conventional graphene material used in the conventional technique.

TABLE 3

Performance Comparison between Physically Prepared Oil-soluble Graphene Paste and Conventional Graphene Material

| Comparison Items | Original Solid Content | Resistivity | RFID Conductive Paste Square Resistance (Adding 5 parts of Graphene) |
|---|---|---|---|
| Conventional Graphene Material | 3% | $5.2 \times 10^{-3}$ $\Omega*cm^{-1}$ | 210 m$\Omega$/□ |
| Oil-soluble Graphene Paste | 5% | $2.0 \times 10^{-3}$ $\Omega*cm^{-1}$ | 120 m$\Omega$/□ |

In some embodiments of the present application, the quick-drying agent is one of or a mixture of any two or more of ethyl acetate, butyl acetate, acetone, and cyclohexanone. In some embodiments, adding a quick-drying agent to the conductive paste may speed up the drying and curing of printed RFID circuits and improve the production speed of RFID electronic tags.

In some embodiments of the present application, the quick-drying agent can also be isophorone, or be a mixture of isophorone and one or more of the above-mentioned ethyl acetate, butyl acetate, acetone, and cyclohexanone. In some embodiments, isophorone not only has a quick-drying effect but also assists in dispersing and reducing the viscosity of graphene and metal conductive agents, which is beneficial to the fluidity of the entire paste system and improves printing performance.

In some embodiments of the present application, by adding a leveling agent and adjusting the ratio of the leveling agent, the conductive paste can fill up the groove and be leveled, and it is ensured that the RFID circuit pattern transferred to the substrate will not flow around and affect the accuracy of the pattern such that the printed RFID electronic icons can have uniform thickness everywhere, stable conductivity, and high consistency.

In some embodiments of the present application, the organic solvent is a dibasic ester (DBE solvent).

A large number of experiments have proven that if the content of the resin in the conductive paste is too high, the conductivity will deteriorate, and if the content of the metal conductive agent is too high, the paste viscosity will be too high, resulting in difficulty in preparation, which is not conducive to cost control. In addition, there is also a strict ratio relationship between the graphene serving as a gap-filling agent and the metal conductive agent. If the content of the graphene is too low, it will be difficult to effectively fill the gaps in the metal conductive agent, reducing the conductive performance. If the content is too high, the connection and bridging in the metal conductive agent will be hindered, reducing the electrical conductivity.

In some embodiments, the above multiple performance requirements make it impossible to achieve the performance of the conductive paste by simply adding up the conventional functions of the various components it contains. In some embodiments, when the properties and functions of different components are mutually affected, it is necessary to adjust the ratio and perform modification and optimization to eliminate undesirable effects and enhance beneficial effects. In the RFID composite conductive paste provided by the present application, each component has to follow a strict ratio relationship, the resin carrier and the graphene paste have been modified and optimized so that they can achieve a better synergistic effect compared with conventional materials.

Another aspect of exemplary embodiments of the present application provides a method for preparing RFID composite conductive paste. In some embodiments, the method for preparing RFID composite conductive paste includes the following steps.

S1: placing an oil-soluble special cross-linked resin and an organic solvent in a container, heating the oil-soluble special cross-linked resin and the organic solvent to 50° C. and dispersing them at a dispersion frequency of 1800-2200 rpm for a dispersion time of 50-70 minutes to obtain a conductive paste carrier.

S2: adding a two-dimensional carbon-based material and a metal conductive agent to the conductive paste carrier, and stirring the conductive paste carrier for 25-35 minutes to obtain a carbon-based composite conductive paste.

S3: adding a quick-drying agent and a leveling agent to the carbon-based composite conductive paste and dispersing the carbon-based composite conductive paste at a dispersion frequency of 800-1200 rpm for a dispersion time of 25-35 minutes to obtain an RFID composite conductive paste.

S4: using a grinder to grind the RFID composite conductive paste.

In some embodiments, using a three-roller grinder to grind the RFID composite conductive paste can further promote the uniform distribution of the conductive components, making it less likely to delaminate or precipitate during the printing process, thereby ensuring the stability of the conductive property of the paste and the product consistency.

However, when using a three-roller grinder for grinding, it is not the case that the more the number of times of grinding, the better, and it is not the case that the higher the fineness of grinding, the better. The reason is that the inappropriate number of times of grinding and distance between opposite rollers may even have a negative impact on the performance of the conductive paste, where the selection of the distance between opposite rollers needs to be determined according to the mesh number of the metal conductive agent. In some embodiments of the present application, the mesh number of the metal conductive agent is 400-600 mesh. In some embodiments, the mesh number of the metal conductive agent is 500 mesh. If the distance between opposite rollers is set too large, the metal conductive agent cannot be effectively ground and dispersed, and if the distance is set too small, the conductive structure of the metal powder and the graphene will be destroyed. In addition, the unground conductive paste will delaminate, making the conductivity of the product unstable. On the contrary, multiple grinding will lead to the destruction of the conductive structure. Due to the influence of the characteristics of graphene itself, multiple grinding will also cause fineness reduction and agglomeration, affecting the conductivity.

Table 4 below lists the comparison of the effects of different numbers of times of grinding on the performance of the conductive paste under the situation that other preparation processes and parameters are the same. From the performance comparison listed in Table 4, it can be found that the performance of the conductive paste that has not been ground by three rollers and the performance of the conductive paste that has been ground multiple times is inferior to that of the conductive paste that has been ground once. The reason is given below. The conductive paste that has not been ground by three rollers will have obvious delamination under thin-film printing, and the agglomeration of the conductive components in the paste, the uneven surface of the dry film, and the deteriorated conductivity and consistency can be observed. After many times of opposite-roller grinding, the conductivity data are obviously deteriorated. The main reason for the deterioration is that the silver and nickel plating in the silver-coated copper powder and the nickel-coated copper powder are damaged, resulting in a reduction in conductive performance, a deterioration in the anti-oxidation performance, and an obvious reduction in performance after being left for a long time.

TABLE 4

Comparison of Effects of Different Number of Times of Grinding on Performance of Conductive Paste

| Comparison Items | No Grinding | Grinding Once | Grinding Twice | Grinding Three Times |
| --- | --- | --- | --- | --- |
| Conductive Paste Coated Square Resistance | 150 mΩ/□ | 120 mΩ/□ | 170 mΩ/□ | 240 mΩ/□ |

In some embodiments of the present application, the grinder is a three-roller grinder, the distance between opposite rollers is 0.4-0.6 mm, and the number of times of grinding is 1. In some embodiments, the process parameters in the above grinding process are based on a large amount of experimental data. After analysis, it was determined that by setting the distance between opposite rollers to 0.4-0.6 mm, the conductive components in the agglomerated state that still exist in the conductive paste after rotation, dispersion, and stirring are further evenly distributed and their delamination is eliminated, and then the number of times of grinding is limited to avoid damage to the microstructure of the metal conductive agent, so as to ensure positive promotion of the performance of the conductive paste.

Example 1

The following steps are used to prepare the RFID composite conductive paste.

Step 1: adding 40 parts by weight of DBE solvent and 10 parts by weight of oil-soluble special cross-linked resin obtained by mixing polyurethane-modified epoxy resin and high-cohesion chlorine-acetate resin into a stirring tank, heating the content of the stirring tank to 50° C., and using a dispersing disk to disperse and stir the content at a frequency of 2000 rpm for one hour to prepare a conductive paste carrier.

Step 2: adding 31 parts by weight of flaky nano-silver coated copper powder (silver content is 10%) and 5 parts by weight of graphene conductive paste to the above-mentioned conductive paste carrier, and continuing stirring the conductive paste carrier for 30 minutes to obtain a carbon-based composite conductive paste.

Step 3: adding 10 parts by weight of butyl acetate and 2 parts by weight of leveling agent to the above-mentioned carbon-based composite conductive paste, and continuing stirring for 30 minutes to obtain an RFID composite conductive paste.

Step 4: using a three-roller grinder to perform opposite-roller grinding on the above-mentioned RFID composite conductive paste once, where the distance between two opposite rollers is 0.6 mm.

Example 2

The following steps are used to prepare the RFID composite conductive paste.

Step 1: adding 31 parts by weight of DBE solvent and 10 parts by weight of oil-soluble special cross-linked resin obtained by mixing polyurethane-modified epoxy resin and high-cohesion chlorine-acetate resin into a stirring tank, heating the content of the stirring tank to 50° C., and using a dispersing disk to disperse and stir the content at a frequency of 2000 rpm for one hour to prepare a conductive paste carrier.

Step 2: adding 38 parts by weight of flaky nano-silver coated copper powder (silver content is 5%) and 6 parts by weight of graphene conductive paste to the above-mentioned conductive paste carrier, and continuing stirring the conductive paste carrier for 30 minutes to obtain a carbon-based composite conductive paste.

Step 3: adding 12 parts by weight of butyl acetate and 3 parts by weight of leveling agent to the above-mentioned carbon-based composite conductive paste, and continuing stirring for 30 minutes to obtain an RFID composite conductive paste.

Step 4: using a three-roller grinder to perform opposite-roller grinding on the above-mentioned RFID composite conductive paste once, where the distance between two opposite rollers is 0.5 mm.

Example 3

The following steps are used to prepare the RFID composite conductive paste.

Step 1: adding 20 parts by weight of DBE solvent and 11 parts by weight of polyurethane-modified epoxy resin into a stirring tank, heating the content of the stirring tank to 50° C., and using a dispersing disk to disperse and stir the content at a frequency of 2000 rpm for one hour to prepare a conductive paste carrier.

Step 2: adding 38 parts by weight of flaky nano-silver coated copper powder (silver content is 3%) and 8 parts by weight of graphene conductive paste to the above-mentioned conductive paste carrier, and continuing stirring the conductive paste carrier for 30 minutes to obtain a carbon-based composite conductive paste.

Step 3: adding 14 parts by weight of butyl acetate and 4 parts by weight of leveling agent to the above-mentioned carbon-based composite conductive paste, and continuing stirring for 30 minutes to obtain an RFID composite conductive paste.

Step 4: using a three-roller grinder to perform opposite-roller grinding on the above-mentioned RFID composite conductive paste once, where the distance between two opposite rollers is 0.4 mm.

Example 4

The following steps are used to prepare the RFID composite conductive paste.

Step 1: adding 31 parts by weight of DBE solvent and 10 parts by weight of polyurethane-modified epoxy resin into a stirring tank, heating the content of the stirring tank to 50° C., and using a dispersing disk to disperse and stir the content at a frequency of 2000 rpm for one hour to prepare a conductive paste carrier.

Step 2: adding 41 parts by weight of flaky nano-nickel coated copper powder (nickel content is 5%) and 3 parts by weight of highly filled conductive carbon black to the above-mentioned conductive paste carrier, and continuing stirring the conductive paste carrier for 30 minutes to obtain a carbon-based composite conductive paste.

Step 3: adding 12 parts by weight of butyl acetate and 3 parts by weight of leveling agent to the above-mentioned carbon-based composite conductive paste, and continuing stirring for 30 minutes to obtain an RFID composite conductive paste.

Step 4: using a three-roller grinder to perform opposite-roller grinding on the above-mentioned RFID composite conductive paste once, where the distance between two opposite rollers is 0.5 mm.

Example 5

The following steps are used to prepare the RFID composite conductive paste.

Step 1: adding 24 parts by weight of DBE solvent and 11 parts by weight of polyurethane-modified epoxy resin and high-cohesion chlorine-acetate resin into a stirring tank, heating the content of the stirring tank to 50° C., and using a dispersing disk to disperse and stir the content at a frequency of 2000 rpm for one hour to prepare a conductive paste carrier.

Step 2: adding 43 parts by weight of modified flaky nanometer copper powder and 4 parts by weight of highly filled conductive carbon black to the above-mentioned conductive paste carrier, and continuing stirring the conductive paste carrier for 30 minutes to obtain a carbon-based composite conductive paste.

Step 3: adding 14 parts by weight of butyl acetate and 4 parts by weight of leveling agent to the above-mentioned carbon-based composite conductive paste, and continuing stirring for 30 minutes to obtain an RFID composite conductive paste.

Step 4: using a three-roller grinder to perform opposite-roller grinding on the above-mentioned RFID composite conductive paste twice, where the distance between two opposite rollers is 0.4 mm.

Example 6

The following steps are used to prepare the RFID composite conductive paste.

Step 1: adding 24 parts by weight of DBE solvent and 11 parts by weight of oil-soluble special cross-linked resin obtained by mixing polyurethane-modified epoxy resin and high-cohesion chlorine-acetate resin into a stirring tank, heating the content of the stirring tank to 50° C., and using a dispersing disk to disperse and stir the content at a frequency of 2000 rpm for one hour to prepare a conductive paste carrier.

Step 2: adding 43 parts by weight of flaky nano-silver coated copper powder (silver content is 5%) and 4 parts by weight of highly filled conductive carbon black to the above-mentioned conductive paste carrier, and continuing stirring the conductive paste carrier for 30 minutes to obtain a carbon-based composite conductive paste.

Step 3: adding 14 parts by weight of butyl acetate and 4 parts by weight of leveling agent to the above-mentioned carbon-based composite conductive paste, and continuing stirring for 30 minutes to obtain an RFID composite conductive paste.

Step 4: using a three-roller grinder to perform opposite-roller grinding on the above-mentioned RFID composite conductive paste once, where the distance between two opposite rollers is 0.4 mm.

Example 7

The following steps are used to prepare the RFID composite conductive paste.

Step 1: adding 20 parts by weight of DBE solvent and 10 parts by weight of modified polyurethane resin into a stirring tank, heating the content of the stirring tank to 50° C., and using a dispersing disk to disperse and stir the content at a frequency of 2000 rpm for one hour to prepare a conductive paste carrier.

Step 2: adding 53 parts by weight of flaky nano-silver coated copper powder (silver content is 10%) and 5 parts by weight of graphene conductive paste to the above-mentioned conductive paste carrier, and continuing stirring the conductive paste carrier for 30 minutes to obtain a carbon-based composite conductive paste.

Step 3: adding 5 parts by weight of butyl acetate, 5 parts by weight of isophorone, and 2 parts by weight of leveling agent to the above-mentioned carbon-based composite conductive paste, and continuing stirring for 30 minutes to obtain an RFID composite conductive paste.

Step 4: using a three-roller grinder to perform opposite-roller grinding on the above-mentioned RFID composite conductive paste once, where the distance between two opposite rollers is 0.4 mm.

Example 8

The following steps are used to prepare the RFID composite conductive paste.

Step 1: adding 20 parts by weight of DBE solvent and 10 parts by weight of saturated polyester resin into a stirring tank, heating the content of the stirring tank to 50° C., and using a dispersing disk to disperse and stir the content at a frequency of 2000 rpm for one hour to prepare a conductive paste carrier.

Step 2: adding 53 parts by weight of flaky nano-silver coated copper powder (silver content is 10%) and 5 parts by weight of highly filled conductive carbon black to the above-mentioned conductive paste carrier, and continuing stirring the conductive paste carrier for 30 minutes to obtain a carbon-based composite conductive paste.

Step 3: adding 5 parts by weight of butyl acetate, 5 parts by weight of isophorone, and 2 parts by weight of leveling agent to the above-mentioned carbon-based composite conductive paste, and continuing stirring for 30 minutes to obtain an RFID composite conductive paste.

Step 4: using a three-roller grinder to perform opposite-roller grinding on the above-mentioned RFID composite conductive paste once, where the distance between two opposite rollers is 0.5 mm.

Example 9

The following steps are used to prepare the RFID composite conductive paste.

Step 1: adding 20 parts by weight of DBE solvent, 2 parts by weight of phenoxy resin, and 10 parts by weight of modified polyurethane resin into a stirring tank, heating the content of the stirring tank to 50° C., and using a dispersing disk to disperse and stir the content at a frequency of 2000 rpm for one hour to prepare a conductive paste carrier.

Step 2: adding 53 parts by weight of flaky nano-silver coated copper powder (silver content is 10%), 2 parts by weight of graphene conductive paste, and 3 parts by weight of highly filled conductive carbon black to the above-mentioned conductive paste carrier, and continuing stirring the conductive paste carrier for 30 minutes to obtain a carbon-based composite conductive paste.

Step 3: adding 6 parts by weight of butyl acetate, 4 parts by weight of isophorone, and 2 parts by weight of leveling agent to the above-mentioned carbon-based composite conductive paste, and continuing stirring for 30 minutes to obtain an RFID composite conductive paste.

Step 4: using a three-roller grinder to perform opposite-roller grinding on the above-mentioned RFID composite conductive paste once, where the distance between two opposite rollers is 0.4 mm.

Example 10

The following steps are used to prepare the RFID composite conductive paste.

Step 1: adding 20 parts by weight of DBE solvent, 4 parts by weight of saturated polyester resin, and 6 parts by weight of modified polyurethane resin into a stirring tank, heating the content of the stirring tank to 50° C., and using a dispersing disk to disperse and stir the content at a frequency of 2000 rpm for one hour to prepare a conductive paste carrier.

Step 2: adding 53 parts by weight of flaky nano-silver coated copper powder (silver content is 10%), 3 parts by weight of graphene conductive paste, and 2 parts by weight of highly filled conductive carbon black to the above-mentioned conductive paste carrier, and continuing stirring the conductive paste carrier for 30 minutes to obtain a carbon-based composite conductive paste.

Step 3: adding 15 parts by weight of isophorone and 2 parts by weight of leveling agent to the above-mentioned carbon-based composite conductive paste, and continuing stirring for 30 minutes to obtain an RFID composite conductive paste.

Step 4: using a three-roller grinder to perform opposite-roller grinding on the above-mentioned RFID composite conductive paste once, where the distance between two opposite rollers is 0.5 mm.

Table 5 below lists the performance comparison of conductive pastes for RFID printing prepared according to examples 2, 3, 7, and 8 and a conductive paste prepared by conventional technique.

TABLE 5

Performance Comparison of Conductive Pastes Prepared by Preferred Embodiments of Present Application and Conventional Technique

| Comparison Items | Film Forming Density | Coated Square Resistance | Resistance on Two Sides of Slit (Coated) | Gravure Printing Square Resistance | Resistance on Two Sides of Slit (Gravure Printing) |
|---|---|---|---|---|---|
| Embodiment 3 | 1.2 g/cm$^3$ | 170 mΩ/□ | 2.00 | 380 mΩ/□ | 4.50 |
| Embodiment 2 | 1.4 g/cm$^3$ | 120 mΩ/□ | 1.40 | 270 mΩ/□ | 3.30 |
| Embodiment 7 | 1.6 g/cm$^3$ | 1000 mΩ/□ | 0.70 | 130 mΩ/□ | 1.60 |
| Embodiment 8 | 1.5 g/cm$^3$ | 1000 mΩ/□ | 1.00 | 170 mΩ/□ | 2.20 |
| Conventional Technique | 0.9 g/cm$^3$ | 1000 mΩ/□ | 5.0 | — | — |

Figure 5:
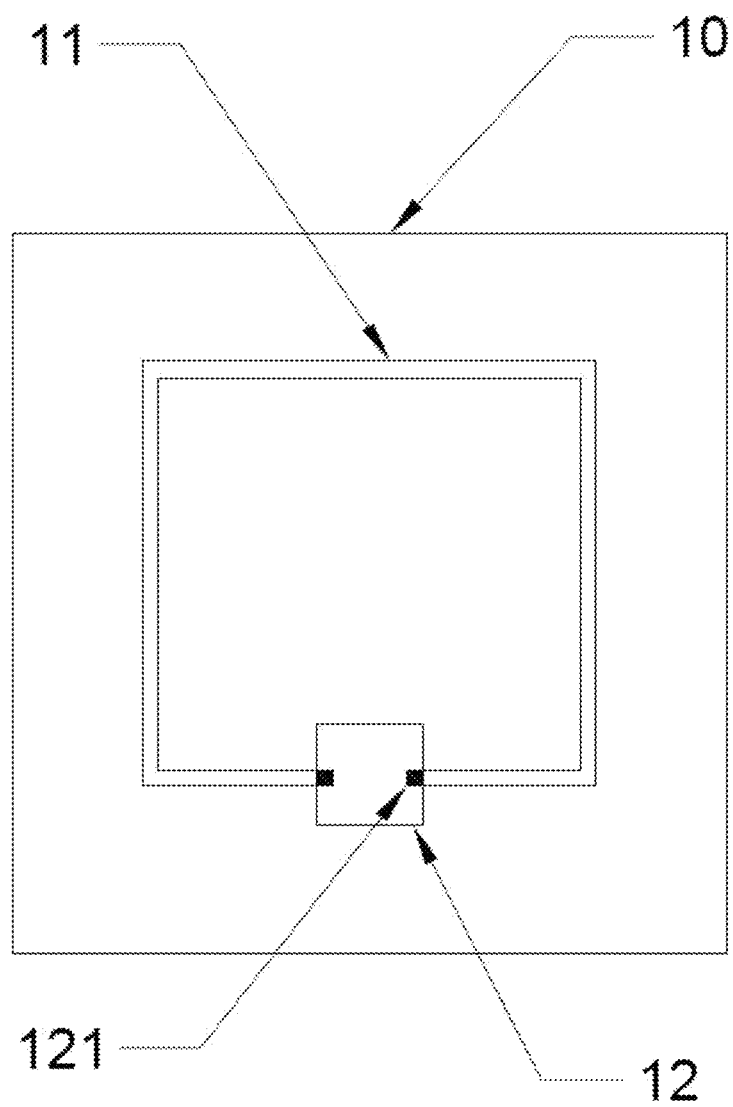
FIG. 5 is a front view of an RFID electronic tag provided according to exemplary embodiments of the present application.
Figure 6:
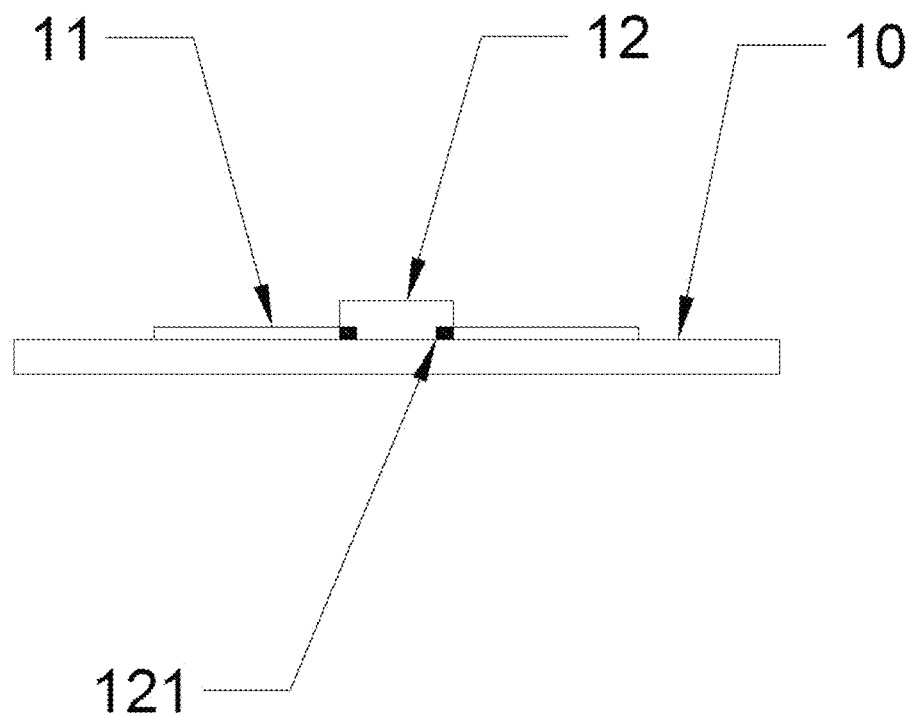
FIG. 6 is a side view of an RFID electronic tag provided according to exemplary embodiments of the present application.

Another aspect of the embodiments of the present application also provides an RFID electronic tag. FIG. 5 and FIG. 6 respectively show a top view and a side view of the RFID electronic tag according to the embodiments of the present application. As shown in FIG. 5 and FIG. 6, the RFID electronic tag provided by the present application includes an insulating substrate 10, an RFID radio frequency circuit 11 fixed on the surface of the insulating substrate, and a control chip 12. The control chip 12 is electrically connected to the RFID radio frequency circuit 11. The RFID radio frequency circuit 11 is made with the above-mentioned RFID composite conductive paste by gravure printing.

In some embodiments, the above-mentioned RFID composite conductive paste can be first poured into the groove of the gravure printing roller and leveled out (where the pattern of the groove is the mirror image pattern of the RFID radio frequency circuit 11 to be produced), and then the RFID composite conductive paste in the groove undergoes rolling depression between the gravure printing roller and the pressing roller and is transferred to the insulating substrate 10 to form an RFID radio frequency circuit 11, and finally, the control chip 12 is fixed to the insulating substrate 10 by bonding or other methods and is electrically connected to the RFID radio frequency circuit by welding or other methods (in FIG. 5 and FIG. 6, the connector 121 is the connection part between the control chip 12 and the RFID radio frequency circuit 11). The above-mentioned method of producing RFID electronic tags through gravure printing is known to those skilled in the art and will not be described in detail here.

FIG. 5 shows a specific pattern of the RFID radio frequency circuit 11. It is easy to know that those skilled in the art can select or change the specific pattern of the RFID radio frequency circuit and the specification and model of the control chip according to actual needs during the actual production of RFID electronic tags. The above selections and changes do not depart from the scope of protection of the claims of the present application.

In some embodiments of the present application, the carbon-based composite conductive paste may have a high content of conductive components and ideal dispersion, uniformity, adhesion, and stability. In some embodiments of the present application, the RFID electronic tags printed using this conductive paste may have excellent conductivity and high consistency in product performance parameters.

The present application may have at least the following beneficial effects.

(1) In some embodiments, the RFID composite conductive paste provided by the present application may have conductive components with high solid content.

Since the resin carrier and graphene paste are modified and optimized, a better synergistic effect may be formed compared with conventional materials, and the solid content of the carrier may increase effectively, such that the conductive paste may have a good ability to accommodate solid conductive components, ensuring that the RFID circuit pattern formed after drying and curing contains sufficient conductive components.

(2) In some embodiments, the RFID composite conductive paste provided by the present application may have ideal dispersion and uniformity.

The conductive paste carrier used in the present application is an oil-soluble special cross-linked resin, and the oil-soluble graphene paste prepared through low-rate high-order intercalated graphite raw materials serves as a gap-filling agent for the metal conductive agent to form a composite conductive structure. The above modified and optimized oil-soluble resin and oil-soluble graphene materials may ensure that the conductive components in the prepared RFID composite conductive paste have good dispersion and uniformity, thereby further improving the performance indicators of the RFID circuit and the final RFID electronic tag.

(3) In some embodiments, the RFID composite conductive paste provided by the present application may have a balanced and stable performance.

For the RFID composite conductive paste provided by the present application, the ratio of each component and the preparation process parameters are determined through a large number of experiments, which may ensure that the properties of fluidity, adhesion, quick-drying, bonding, and so on are in a balanced state, and the properties of the conductive paste are stable.

The exemplary embodiments of the present application have been introduced in detail above. For those skilled in the art, without departing from the principles of the present application, several improvements and modifications can be made to the present application. These improvements and modifications also fall within the scope of protection of the claims of the present application.

What is claimed is:
1. An RFID composite conductive paste comprising:
10-25 parts by weight of oil-soluble special cross-linked resin, 30-50 parts by weight of metal conductive agent, 5-10 parts by weight of two-dimensional carbon-based material, 20-50 parts by weight of organic solvent, 10-20 parts by weight of quick-drying agent, and 2-5 parts by weight of leveling agent; the oil-soluble special cross-linked resin is a polyurethane-modified epoxy resin, and a carrier saturated solid content of the polyurethane-modified epoxy resin in an oil-soluble system is ≥55%;

a high-cohesion chlorine-acetic resin is also added to the oil-soluble special cross-linked resin, and a dry-film density of the high-cohesion chlorine-acetic resin is $\geq 1.4$ g/m$^3$; and the two-dimensional carbon-based material is a physically prepared oil-soluble graphene paste that includes 9 to 11 graphene layers;

wherein the physically prepared oil-soluble graphene paste is prepared through the following steps:

step 1: mixing a high-order intercalated graphite with a dibasic ester and an oil-soluble special cross-linked resin to obtain an initial graphene paste, wherein the high-order intercalated graphite has a magnification ratio of 150-350 times and a purity of $\geq 99\%$; and step 2: performing liquid-phase delamination on the initial graphene paste under high pressure to obtain the physically prepared oil-based graphene paste that includes 9 to 11 graphene layers.

2. The RFID composite conductive paste according to claim 1, wherein the metal conductive agent is one of or a mixture of any two or more of silver-coated copper powder, silver-coated nickel powder, nickel-coated copper powder, and modified conductive copper powder.

3. The RFID composite conductive paste according to claim 1, wherein the quick-drying agent is one of or a mixture of any two or more of ethyl acetate, butyl acetate, acetone, and cyclohexanone.

4. A method for preparing an RFID composite conductive paste, which is used to prepare the RFID composite conductive paste according to claim 1, the method comprising the following steps:

S1: placing an oil-soluble special cross-linked resin and an organic solvent in a container, heat the oil-soluble special cross-linked resin and the organic solvent to 50° C., and dispersing the oil-soluble special cross-linked resin and the organic solvent at a dispersion frequency of 1800-2200 revolutions per minute for a dispersion time of 50-70 minutes to obtain a conductive paste carrier;

S2: adding a two-dimensional carbon-based material and a metal conductive agent to the conductive paste carrier and stirring the conductive paste carrier for 25-35 minutes to obtain a carbon-based composite conductive paste;

S3: adding a quick-drying agent and a leveling agent to the carbon-based composite conductive paste and disperse the carbon-based composite conductive paste at a dispersion frequency of 800-1200 revolutions per minute for a dispersion time of 25-35 minutes to obtain an RFID composite conductive paste; and S4: using a grinder to grind the RFID composite conductive paste.

5. The method for preparing an RFID composite conductive paste according to claim 4, wherein the grinder is a three-roller grinder, a distance between opposite rollers is 0.4-0.6 mm, and the number of times of grinding is 1.

6. An RFID electronic tag includes an insulating substrate, an RFID radio frequency circuit fixed on a surface of the insulating substrate, and a control chip electrically connected to the RFID radio frequency circuit, wherein:

the RFID radio frequency circuit is made by gravure printing using the RFID composite conductive paste according to claim 1.

* * * * *